United States Patent [19]

Lysenko et al.

[11] Patent Number: 5,035,552
[45] Date of Patent: Jul. 30, 1991

[54] TWIST DRILL FOR DEEP HOLE DRILLING

[76] Inventors: Viktor G. Lysenko, prospekt Masherova, 47, korpus 1, kv. 278; Lev G. Yudovin, ulitsa Uralskaya, 10, kv. 26, both of Minsk, U.S.S.R.

[21] Appl. No.: 490,647
[22] PCT Filed: Sep. 29, 1988
[86] PCT No.: PCT/SU88/00193
§ 371 Date: May 25, 1990
§ 102(e) Date: May 25, 1990
[87] PCT Pub. No.: WO90/03238
PCT Pub. Date: Apr. 5, 1990
[51] Int. Cl.⁵ .............................. B23B 51/02
[52] U.S. Cl. .................................... 408/230
[58] Field of Search ................. 408/227, 230

[56] References Cited

U.S. PATENT DOCUMENTS 3,749,189 7/1973 Boehm ........................... 408/230
4,210,215 7/1980 Peetz et al. ..................... 408/230

FOREIGN PATENT DOCUMENTS 521074 9/1976 U.S.S.R. ........................ 408/230
622588 9/1978 U.S.S.R. ........................ 408/230

Primary Examiner—Daniel W. Howell
Attorney, Agent, or Firm—Burgess, Ryan & Wayne

[57] ABSTRACT

A twist drill for deep hole drilling comprises a cutting portion, margins (2) and helical flutes (3) designed for chip removal. The front-end wall (4) of the helical flute (3) comprises two conjugate sections (7, 8). The first section (7) intersecting with the margin (2) forms with the generatrix of the twist drill outer cylindrical surface an angle ($\psi$) which is smaller than 90°. The angle ($\delta$) of inclination of the tangent at any point of the second sections (8) of the front-end wall (4), to the generatrix (9) of the twist drill outer cylindrical surface is selected proceeding from the relationship:

$$125° > \delta > (57° - \omega) \cdot K + 90°,$$

where: $\omega$ is the angle of helix of the helical flute (3) relative to the twist drill axis at the point under consideration.

$K = 1.4 - 2.1.$

3 Claims, 1 Drawing Sheet

TWIST DRILL FOR DEEP HOLE DRILLING

FIELD OF THE INVENTION

The present invention relates to machining of metals and other materials, and more specifically to a twist drill for deep-hole drilling.

Drilling is one of the most widely, known operations in metal working. Usually this operation is characterized by low productivity and substantial consumption of tools. Drills comprise approximately 30% of the produced end-cutting tools. An especially low productivity is peculiar to drilling holes more than ten diameters deep, i.e. to the deep hole drilling. Therefore, there exists a problem of increasing the productivity of drilling such holes.

BACKGROUND OF THE INVENTION

State and Analysis of the Prior Art Known in the prior art is a twist drill for deep hole drilling, comprising a cutting portion, margins and helical flutes designed for removal of chips (SU, A, 701,743). Each of the helical flutes is arranged at an angle relative to the twist drill axis front-end wall nearest the cutting portion of the drill and conjugated with a flute bottom which is parallel with the twist drill axis and which is conjugated with a rear-end wall.

The known twist drill makes it possible to drill holes with a depth of up to 50 diameters without periodically withdrawing the drill due to an enlarged angle of flute helix ($\omega=45°-60°$) and an inclination of the flute front-end wall relative to the twist drill axis through an angle $\delta$ which is greater than 90°, the front-end wall being made reactilinear. Productivity in drilling deep holes with such a twist drill is higher in comparison with that of the widely known twist drills used for the deep hole drilling. The combinations of correctly selected three main design parameters, i.e. rational dimensions, shape and angle of flute helix made it posible not only to eliminate periodical withdrawals of the drill but also to substantially improve the torsional stiffness of a twist drill. This is explained by the fact that the provision of a reliable removal of chips from the hole being drilled allows the dimensions of the helical flutes to be substantially reduced and the diameter of a drill core to be increased, as there is no need to have the helical flutes of a large volume for accumulation of chips. The known twist drill possesses a comparatively high stiffness combined with a reliable chip removal. This is achieved by reducing the angle of flute helix $\omega$ at the expense of introducing an angle of inclination $\delta$ of the front-end wall. The occurence of a force pressing the element of a chip against the wall of a hole made it possible to improve the conditions of the chip removal.

However, due to the fact that the front-end wall of a helical flute has throughout its full heights one and the same angle of inclination relative to the twist drill axis, the conditions of the chip removal on the entire length of the front-end wall are not equal. So, the inclination in the middle portion of the helical flute in the place of contact with large elements and curls of chips is useful, as it improves the conditions of the chip removal. The same inclination at the periphery of the helical flute in the place of contact with pulverulent particles and fine fragments of chips is unfavourable, as it impairs the working conditions of the known twist drill and reduces its endurance. This is associated with the fact that in a cross-section of the twist drill the front-end wall of such a helical flute is formed near the periphery by a convex curve, i.e. by the convolute and at the point of intersection with the margin said front-end wall forms an obtuse angle. This leads to jamming of the fine and pulverulent particles of chips in the clearance between the drill and the hole, and to their sticking to the margins, as well as impairs the twist drill endurance and increases the torque.

SUMMARY OF THE INVENTION

The present invention is essentially aimed at providing a twist drill for deep hole drilling having such an embodiment of helical flutes which will provide a reliable chip removal in combination with the maximum possible torsional stiffness of the twist drill, and will eliminate the sticking of a drilled out material to the margins.

This aim is attained by a twist drill for deep hole drilling, comprising a cutting portion, margins and helical flutes designed for chip removal, each of which is arranged angularly relative to the twist drill axis front-end wall nearest the cutting portion of the drill and conjugated with a flute bottom which is parallel with the twist drill axis and which is conjugated with a rear-end wall, according to the invention, the front-end wall comprises two conjugate sections a first of which intersects the margin and forms the generatrix of the twist drill outer cylindrical surface at an angle which is less than 90°, while an angle of inclination of the tangent at any point of the second sections of the front-end wall to the generatrix of the twist drill outer cylindrical surface is selected from the relationship:

$$125° > \delta > (57° - \omega) \cdot K + 90°,$$

where: $\omega$ is the angle of flute helix relative to the twist drill axis at the point under consideration, $$K = 1.4 - 2.1.$$

The length of a projection of the first section on the plane perpendicular to the axis of the twist drill may suitably comprise 0.05–0.3 of helical flute depth.

This will prevent jamming of the fine particles of chips between the twist drill and the hole wall without impairing the chip removing properties of the helical flute.

The lead of a helical flute is preferably selected according to the following formula:

$$P = (2-2.6) d,$$

where: d is the diameter of a twist drill.

This provides a reliable chip removal along with the preservation of a comparatively high stiffness of the twist drill.

The twist drill for deep hole drilling made according to the present invention insures an uninterrupted removal of chips from the hole being drilled, thereby making it possible to drill deep holes without periodically withdrawing the proposed drill, i.e. in one pass. The proposed drill possesses an increased torsional stiffness which makes it possible to employ increased cutting speeds and feeds. The proposed twist drill may be used on any drilling machines without their modernization. Besides, the manufacturing methods used in production of the twist drill embodiment according to the invention practically do not differ from the manufacturing methods used in producing of widely known twist drills.

BRIEF DESCRIPTION OF THE DRAWINGS

Now the invention will be described in greater detail with reference to a specific embodiment thereof, taken in conjunction with the accompanying drawings, wherein.

DETAILED DESCRIPTION OF THE INVENTION

Figure 1:
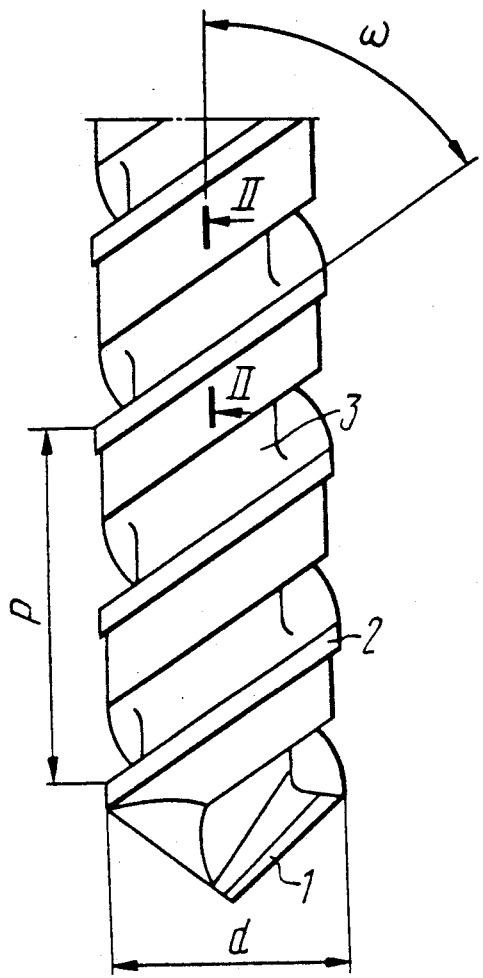
FIG. 1 illustrates a general view of a twist drill for deep hole drilling, according to the invention.

A twist drill for deep hole drilling comprises a cutting portion 1 (FIG. 1), margins 2 and helical flutes 3 designed for the chip removal.

Figure 2:
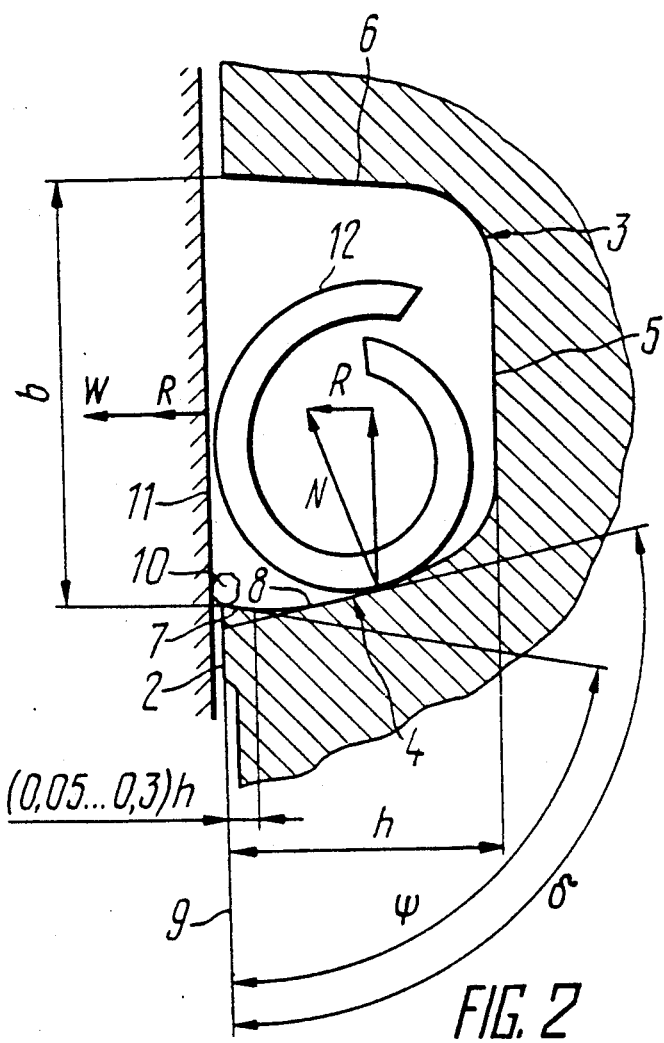
FIG. 2 is a section taken along the line II—II of FIG. 1 illustrating a diagram of forces acting on an element of the chip.

Each helical flute 3 is formed by a front-end wall 4 arranged at an angle δ (FIG. 2) to the twist drill axis and conjugate with a flute bottom 5 parallel with the twist drill axis and conjugate with a rear-end wall 6.

The front-end wall 4 comprises two conjugate sections 7,8. The first section 7 intersects with the margin 2 and forms with a generatrix 9 of the twist drill outer cylindrical surface an angle $\psi < 90°$. The length of a projection of the first section 7 of the front-end wall 4 on the plane perpendicular to the twist drill axis comprises 0.05-0.3 of a depth h of the helical flute 3. Due to such geometric parameters of the first section 7, a sharpening is formed at the periphery of the drill in the cross-section and a created normal pressure force N is directed so that it breaks fine particles 10 of chips away from a hole wall 11 and prevents them from being jammed in the clearance between the twist drill and the hole wall. The sharpening at the point of transition of the front-end wall 4 of the helical flute 3 into the marging 2 improves the twist drill endurance by several times when compared with the twist drills having at this point the angle $\psi > 90°$. If the dimension of the first section 7 at which the sharpening is formed, is too small, i.e. commensurable with the dimensions of pulverulent and fine particles 10 of chips, the endurance of a twist drill decreases due to the sticking of these fine particles 10 to the margins 2. It is not rational to make this section 7 less than 0.05 of the depth h of the halical flute 3. If the dimension of the first section 7 is over 0.3 of the depth of the helical flute 3, the medium and coarse elements 12 of chips come in contact with the front-end wall 4 at the points where a radial component R of the normal pressure force N is too small or is directed toward the twist drill axis which reduces the chip removing properties of the helical flutes 3.

The second section 8 conjugate with the bottom 5 of the helical flute 3 is made so that the angle δ of inclination of the tangent, passing through a conjugate point of the first and second sections 7, 8 of the front-end wall 4, to the generatrix 9 of the twist drill outer cylindrical surface is selected from the relationship:

$$125° > \delta > (57° - \omega) \cdot K + 90°,$$

where: ω (FIG. 1) is the angle of helix of the helical flute 3 relative to the twist drill axis at the point under consideration, $K = 1.4-2.1$.

The presence of the angle δ (FIG. 2) brings about a radial component of the normal pressure force N with which the twist drill acts on the element 12 of the chip. A vector of the radial component R being added together with the vector of a centrifugal force W presses the element 12 of the chip against the hole wall 11 which increases the force of friction of the chips on the wall of a drilled hole and, consequently, improves conditions of chip removal. When the angle δ is increased from 90° to 120° the conditions of chip removal are improved. When the angle $\delta > 125°$, there occur negative phenomena which reside in that the force N pressing the chips against the hole wall increases to such a value that when drilling in steel, cast irons and other structural materials annular grooves are caused on the hole walls 11 under the action of chips because of which the chip removal is disturbed.

Conducted experiments have proved that in order to ensure the reliable removal of chips when the front-end wall 4 has no inclination, it is desirable that the angle ω (FIG. 1) of helix of the helical flutes relative to the twist drill axis be in a range of 57° to 62°. The inclination of the front-end wall 4 (FIG. 2) makes it possible to ensure a reliable chip removal with the angle ω reduced to 52°-54°. This increases the stiffness of a twist drill as the stiffness is associated with the angle ω.

As the chips do not accumulate in the drill helical flutes 3, it becomes possible to reduce the dimensions of these flutes 3 which provides an additional increase in the twist drill stiffness. A width b of the helical flute 3 is reduced at the periphery of the twist drill and comprises (0.2-0.3) P, where P (FIG. 1) is the lead of the helical flute 3. The lead P of the helix is selecting proceeding from the conditions of the uninterrupted removal of chips. When the depth of drilling is over 50 diameters and the angle $\delta = 95° - 125°$ the lead of helix is selected proceeding from the condition that $P = (2-2.6)d$, where d is the drill diameter. When the lead P of helix (at a greater angle ω) is smaller the stiffness if the twist drill is reduced, while at $P > 2.6d$ the chip removal is disturbed.

Industrial Applicability

To the most advantage the present invention may be used for deep hole drilling in parts of motor vehicles, tractors and hydrojets.

We claim:

1. A twist drill for deep hole drilling, comprising a cutting portion, margins and helical flutes designed for chip removal, each of said flutes is arranged at an angle relative to the twist drill axis front-end wall nearest the cutting portion of the drill and is conjugated with a flute bottom which is parallel with the twist drill axis and which is conjugated with a rear-end wall, said front-end wall comprising two conjugate sections, the first section intersecting with the margin to thereby form, with the generatrix of the twist drill outer cylindrical surface, an angle of less than 90°, while the angle of inclination of the tangent at any point of the two conjugate sections of the front-end wall, to the generatrix of the twist drill outer cylindrical surface is selected from the relationship:

$$125° > \text{angle of inclination} > (57° - w)K + 90°,$$

wherein w is the helix angle of the helical flute relative to the twist drill axis at the point under consideration, and $K$ is from 1.4 to 2.1.

2. The twist drill of claim 1 wherein the length of a projection of the first section on a planar perpendicular to the twist drill axis is 0.05–0.3 of the depth of the helical flute.

3. The first drill of claim 1 wherein the lead (P) of the helical flute satisfies the following formula:

$P = (2-2.6)d,$ wherein d is the diameter of the twist drill.